Aug. 23, 1966   J. W. ERICKSON ETAL   3,268,769
SAFETY DEVICE
Filed July 23, 1963
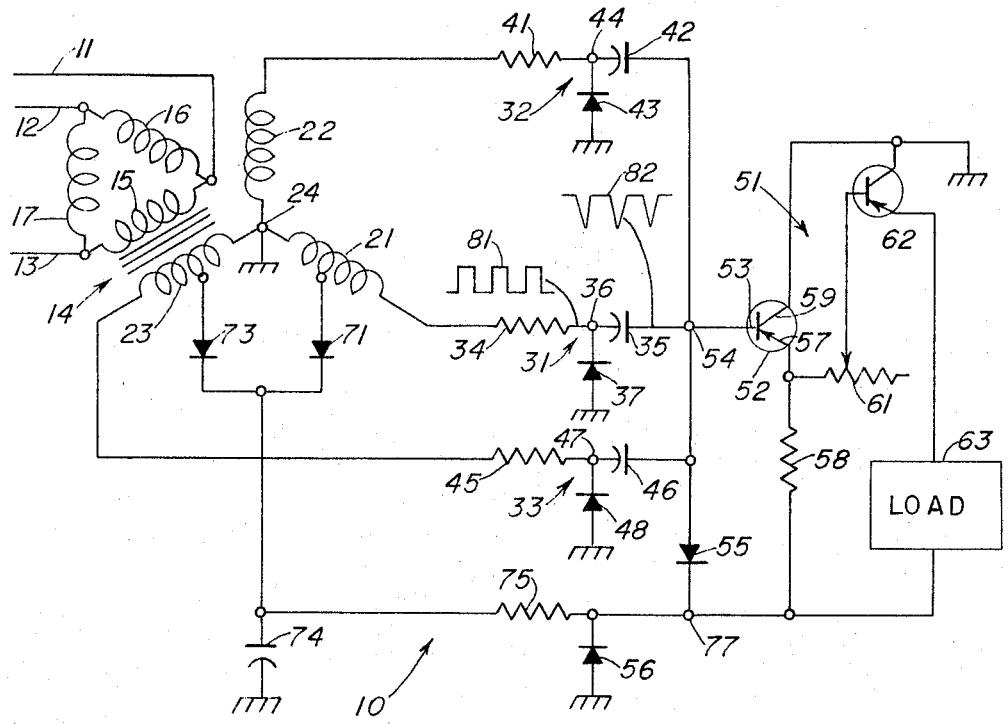
INVENTORS
JOHN W. ERICKSON
ROBERT W. WINGFIELD
BY
Wallace, Kinger & Dorn
Their Attys

United States Patent Office 3,268,769
Patented August 23, 1966

3,268,769
SAFETY DEVICE
John W. Erickson, Park Ridge, and Robert W. Wingfield, Niles, Ill., assignors to Erickson Electrical Equipment Co., Chicago, Ill., a corporation of Illinois
Filed July 23, 1963, Ser. No. 297,135
4 Claims. (Cl. 317—46)

This invention relates to a safety device and more particularly to a new and improved device for detecting failure of one or more phases in a plural-phase A.C. power transmission system. The invention is described hereinafter in connection with a conventional three-phase transmission arrangement but is equally applicable to two-phase systems and other plural-phase arrangements.

A variety of devices are known in the art for detecting failures of one or more phases in a three-phase or other plural-phase transmission system. Such devices have usually constituted voltage comparators for comparing the voltages of the individual phases or with a reference voltage. These prior art phase failure detectors, in general, have had to be custom built to fit the voltage or amperage conditions of the transmission system. That is, a phase failure detector suitable for operation on a 2400-volt transmission system would not ordinarily be applicable to a 600-volt system, and vice versa.

Thus, a principal difficulty with respect to previously known phase failure detectors has been the necessity of maintaining a relatively large variety of devices available to fit the widely differing voltage requirements of different transmission systems. Another difficulty, occasionally encountered with voltage comparison devices, is that the device may be workable under ordinary conditions and may indicate an expected type of phase failure, but might fail to operate in response to other forms of fault along the transmission system affecting one or more phases of the system.

It is a principal object of the present invention, therefore, to afford a new and improved phase failure detector, for an A.C. power transmission system, that effectively overcomes the above noted difficulties and disadvantages of previously known devices.

A more specific object of the invention is to provide a new and improved safety device for detecting the failure of one or more phases of a plural-phase A.C. transmission system that is not based upon the comparison of voltages of the various phases in the system. A principal feature of the present invention is the provision of a phase failure detector that functions essentially as a pulse counting circuit and consequently may be operated over a wide range of voltage and amperage conditions in the transmission system with which it is associated.

A particular object of the invention is to provide a new and improved phase failure detector for an A.C. power transmission system that is independent of voltage variations in the transmission system and that includes its own integral power supply which is also substantially independent of the voltage level in the transmission system.

A further object of the invention is to afford a simple, efficient, and inexpensive device that may be applied to a variety of different A.C. transmission systems to detect phase failures therein without requiring any modification or adjustment to fit the operating conditions of a particular transmission system.

Other and further objects of the present invention will be apparent from the following description and claims and are illustrated in the accompanying drawing which, by way of illustration, shows a preferred embodiment of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawing, the single view illustrates a typical embodiment of the present invention in schematic circuit form.

The safety device 10 illustrated in FIG. 1 constitutes a phase failure detector for a conventional three-phase A.C. power transmission system. The power transmission system is illustrated by the three conductors 11, 12, and 13; it should be understood that any conventional three-phase system may be monitored by the safety device.

The input to safety device 10 comprises a transformer 14 having three primary windings 15, 16, and 17 on a suitable core illustrated schematically at 18. The primary windings 15, 16 and 17 are shown in delta connection but a "Y" connection may be used for the primary of the transformer if desired. Transformer 14 further includes three secondary windings 21, 22, and 23, thus affording one secondary winding associated with each phase of the A.C. transmission system. The secondary windings 21–23 are preferably connected in a "Y" configuration with the common terminal 24 of the secondary side of the transformer connected to system ground. When the term "ground" is employed in this specification and in the appended claims, it should be understood that it encompasses any substantially unipotential plane and is not limited to an earth-ground connection.

The safety device 10 includes a plurality of sensing circuits each individually coupled to a respective phase of the A.C. transmission system being monitored. In the embodiment shown in the drawing, the three sensing circuits are identified as circuits 31, 32 and 33, which are connected to transformer secondaries 21, 22 and 23 respectively. Sensing circuit 31 comprises a resistor 34 connected in series with a capacitor 35, the common terminal 36 between the circuit elements 34 and 35 being returned to system ground through a zener diode 37. Circuit 32 is similar and includes a resistor 41, a capacitor 42, and a zener diode 43 connected from the junction 44 of the resistor and the capacitor to ground. The third sensing circuit includes the resistor 45 connected in series with a capacitor 46 and having the junction 47 of the two impedances connected through a zener diode 48 to ground.

In addition to the three sensing circuits 31, 32 an 33, safety device 10 includes pulse counter means, the circuit 51. Circuit 51 is a counter or summing circuit in the sense that it continuously adds together the pulse outputs of the three sensing circuits. A more elaborate form of counter, such as a multi-stage shift register, could be used, but is unnecessary to the present application. The key requirement of the counter means employed is that it sums up the pulse outputs on a time basis.

The pulse counter circuit 51 includes a first transistor or other suitable controlled semi-conductor electric discharge device 52 having the usual complement of input, output, and control electrodes. In the circuit 51, the base electrode 53 of the transistor is utilized as the control electrode and is connected to an input terminal 54 that is also connected to each of the three capacitors 35, 42 and 46 of the sensing circuits 31, 32 and 33. Terminal 54 is also returned to system ground through a circuit that includes a blocking diode 55 and, in series therewith, a zener diode 56.

The output electrode of transistor 53, the emitter 57, is connected through a load resistor 58 to the zener diode 56, the zener diode constituting a part of a bias circuit as described more fully hereinafter. The collector electrode 59 of the transistor, which constitutes the input electrode in the illustrated emitter follower circuit, is returned to ground. The output connection from emitter 57 is taken through a coupling resistor, shown as a potentiometer 61, to the base electrode of a second transistor 62. Transistor 62 is also connected as an emitter follower, the collector being returned to ground and the emitter being connected through a load 63 back to the zener diode 56. The load 63 may comprise the operating coil of a suitable relay employed to shut down or otherwise control the operation of the transmission system 11–13 being monitored by the safety device 10. On the other hand, the load may merely constitute an indicator device of one form or another, such as a conventional ammeter.

The biasing circuit for safety device 10 includes a pair of diodes 71 and 73 that are individually connected to taps on the transformer secondaries 21 and 23 respectively. Diodes 71 and 73 are connected to each other and are returned to ground through a relatively large capacitor 74. In addition, the diodes are connected through a resistor 75 to the zener diode 56 to complete the biasing circuit.

In considering operation of the safety device 10, it may first be assumed that the transmission system comprising transmission lines 11, 12 and 13 is in normal operation and that the voltages induced in the secondary windings 21, 22 and 23 of transformer 14 are approximately equal and are approximately balanced in phase displacement relative to each other. That is, there is approximately 120° phase displacement between the voltages induced in each phase, relative to each of the other two phases. In actual practice, the relative voltages may be substantially different from each other and the phase voltages may vary over a substantial range without affecting operation of the safety circuit, as explained more fully hereinafter.

Sensing circuit 31, in the illustrated circuit arrangement, functions as a clipping and amplitude limiting circuit. That is, the signal appearing at terminal 36 is limited in amplitude by virtue of the operating characteristics of the zener diode 37, the amplitude of the signal voltage being essentially constant at the breakdown back voltage for the diode. Consequently, the waveform of the signal at terminal 36 approximates a unidirectional pulse signal of substantially rectangular configuration such as shown by the waveform 81. The pulse signal 81, of course, has a repetition frequency that is equal to the frequency of the signal from transformer secondary 21, which would be 50 or 60 cycles per second in a conventional power transmission system.

The output signal from circuit 31 is modified in waveform by the capacitor 35 in the output circuit. Thus, the output signal supplied from capacitor 35 to the input terminal 54 of the pulse counter circuit 51 constitutes a series of negative-going spikes as shown by the waveform 82.

The remaining two sensing circuits 32 and 33 are essentially identical with circuit 31. Hence, it is seen that each of the sensing circuits constitutes a uni-polar amplitude limiter producing a pulse signal of substantially constant amplitude and having a frequency equal to the frequency of the A.C. signal in the associated phase of the transmission system. The amplitude-limiting operation of these circuits affords an output pulse signal from each that is substantially constant in amplitude over a wide range of variations in the amplitude of the induced voltages in the transformer secondaries. Thus, a given transformer 14, when coupled to a particular transmission system, might produce output voltages of the order of 100 volts, whereas the same transformer 14 applied to a different transmission system would afford output voltages, in the transformer secondaries, of perhaps 600 volts. But the amplitude of the output signals from circuits 31, 32 and 33 remains essentially constant, due to their inherent limiting characteristics, despite the change in input voltage level. It is for this reason that the device 10 may be applied to transmission systems of quite different voltage characteristics without modification or adjustment.

The biasing circuit for device 10 operates on substantially the same principle. That is, zener diode 56 and resistor 75 function as a limiter circuit to afford a substantially constant voltage level at the output terminal 77, despite the fact that voltage conditions may vary substantially with respect to the input to the biasing circuit. Stated differently, the biasing circuit illustrated produces a substantially constant biasing voltage regardless of the actual available voltage on the second windings 21 and 23 of transformer 14. Of course, the diodes 71 and 73 could be connected to any two of the transformer secondaries; there is nothing critical about selection of the particular transformer secondaries 21 and 23.

The bias voltage applied to transistor 52 normally maintains the transistor cut off in the absence of a signal on the base electrode 53. The input pulse signals to the transistor from sensing circuits 31–33, however, periodically render the transistor conductive, producing an output signal that is supplied to the second transistor 62. This occurs at a rate of 180 cycles per second, assuming a 60-cycle A.C. system. Inasmuch as the input pulse signals from the sensing circuits are approximately constant in amplitude, the control signal produced in the input-output conduction path of the transistor 62, between the emitter and collector, is of approximately constant amplitude. This constant amplitude signal, applied to load 63, affords a clear indication that there has been no failure of any phase of the transmission system being monitored.

In the event of a failure of one phase of the transmission system 11–13, the induced voltage in one of the three secondaries 21–23 of transformer 14 is reduced to negligible amplitude. Assuming that the secondary 22 now produces no substantial voltage, it is seen that the output signal from sensing circuit 32 is, for all practical purposes, of zero amplitude. Under these conditions, the transistor 52 is rendered conductive only two-thirds as often as under normal operating conditions and this is equally true with respect to transistor 62. The effective average amplitude of the control signal supplied to load 63, accordingly, is reduced in amplitude by a factor of one-third. This substantial change in the control signal affords a clear indication of the failure of one phase of the transmission system and may be utilized to control suitable switching apparatus or to actuate indicators to inform an operator of the existence of a failure.

If two phases of the transmission system were to fail, then the output signal from two of the sensing circuits 31 and 33 would be interrupted. Under these circumstances, transistors 52 and 62 conduct only one-third of the normal time, reducing the average amplitude of the output or control signal supplied to load 63 by a factor of two-thirds. The load 63 may be arranged to differentiate between a failure involving one phase or a failure involving two phases, although this is not essential. Either failure, of course, can be clearly recognized by a meter, a relay, or other suitable detecting device. The only requirement is that the overall circuit operate on the basis of average available current or voltage, since the peak output from the circuit 51 remains the same under conditions of failure, only the average output being affected.

With respect to the pulse counting circuit 51, it should be understood that it is not essential that this circuit comprise two stages as illustrated. With a suitably sensitive load 63, the load may be connected directly to the initial stage of the pulse counter circuit, eliminating the second stage comprising resistor 61 and transistor 62. That is, the load 63 would be directly substituted for the load impedance 58 in the emitter circuit of transistor 52, or it could be connected in the collector circuit. Other forms of pulse counting or summation apparatus may be utilized if desired; however, the illustrated circuit is extremely simple and yet highly effective particularly when only one stage is employed.

In order to afford a more complete illustration of the present invention, specific circuit values are given hereinafter for a safety device 10 that may be operated over a range of voltages, on the secondary windings of the transformer 14, from at least 100 to 600 volts. It should be understood that the specific circuit data are incorporated herein solely for purposes of illustration and in no sense as a limitation on the invention.

| Circuit component: | Value or type |
| --- | --- |
| Resistors 34, 41, 45 | 47 kilohms. |
| Resistor 58 | 1000 ohms. |
| Resistor 75 | 180 ohms. |
| Potentiometer 61 | 25–40 ohms. |
| Capacitors 35, 42, 46 | 0.01 microfarad. |
| Capacitor 74 | 250 microfarads. |
| Diodes 37, 43, 48 | 20 volt zener. |
| Diode 56 | 10 volt zener. |
| Diode 55 | 1N34. |
| Diodes 71, 73 | 1N538. |
| Transistors 52 and 62 | 2N1143. |

As may be seen from the foregoing, safety device 10, though simple and inexpensive, affords a single phase failure detector that may be applied to voltage transmission lines operating at substantially different voltages. The circuit includes its own power supply which is also substantially independent of the voltage characteristics of the transmission system. The essential freedom from dependence upon voltage characteristics of the transmission system is achieved by utilization of pulse counting or time summation as the basic principle of operation, in contrast with the voltage comparison techniques of the prior art.

Hence, while a preferred embodiment of the invention has been described and illustrated, it is to be understood that this is capable of variation and modification, and we therefore do not wish to be limited to the precise details set forth, but desire to avail ourselves of such changes and alterations as fall within the purview of the following claims.

We claim:

1. A safety device for detecting a failure of one or more phases of a plural-phase A.C. power transmission system comprising:

a plurality of sensing circuits, each individually coupled to a respective phase of said transmission system, and each effective to produce a pulse signal having a repetition frequency determined by the frequency of the A.C. signal in the associated phase of the transmission system, each sensing circuit comprising a unipolar amplitude limiter producing a pulse signal of substantially constant amplitude over a wide range of variations in amplitude of the A.C. signal in said transmission system;

pulse counter means, connected to all of said sensing circuits, for effectively summing up the combined pulse output of said sensing circuits to develop a normally constant control signal, said control signal changing substantially in the absence of pulse signals from any one or more of said sensing circuits;

and a control device coupled to said pulse counter means for actuation in response to changes in said control signal.

2. A safety device for detecting a failure of one or more phases of a plural-phase A.C. power transmission system comprising:

a transformer, connected to said transmission system and having one secondary for each phase of said transmission system, said secondaries being Y-connected with a common ground terminal;

a plurality of sensing circuits, each individually coupled to a respective one of said transformer secondaries, and each effective to produce a pulse signal of substantially constant amplitude over a wide range of transmission system voltages and having a repetition frequency equal to the frequency of the A.C. signal in the associated phase of the transmission system, each sensing circuit comprising a resistor and a capacitor connected in series to the associated transformer secondary and a zener diode connected from the junction of said resistor and capacitor to ground;

pulse counter means, connected to all of said sensing circuits, for effectively summing up the combined pulse output of said sensing circuits to develop a normally constant control signal, said control signal changing substantially in the absence of pulse signals from any one or more of said sensing circuits;

and a control device coupled to said pulse counter means for actuation in response to said control signal.

3. A safety device for detecting a failure of one or more phases of a plural-phase A.C. power transmission system comprising:

a plurality of sensing circuits, each individually coupled to a respective phase of said transmission system, and each effective to produce a pulse signal of substantially constant amplitude over a wide range of voltages in the A.C. transmission system and having a repetition frequency determined by the frequency of the A.C. signal in the associated phase of the transmission system;

pulse counter means comprising a semi-conductor electric discharge device having input, output and control electrodes with said control electrode connected to all of said sensing circuits, and biasing means biasing the input-output conduction path of said discharge device toward cut off, for effectively summing up the combined pulse output of said sensing circuits, and developing in said input-output path a normally constant control signal, said control signal being reduced substantially in amplitude in the absence of pulse signals from any one or more of said sensing circuits;

and a control device coupled to said input and output electrodes of said pulse counter means for actuation in response to said control signal.

4. A safety device for detecting a failure of one or more phases of a plural-phase A.C. power transmission system comprising:

a plurality of sensing circuits, each comprising a zener diode clipper circuit individually coupled to a respective phase of said transmission system, and each effective to produce a pulse signal of constant amplitude over a broad range of transmission voltages and having a repetition frequency equal to the frequency of the A.C. signal in the associated phase of the transmission system;

pulse counter means, comprising a pulse amplifier having an input connected to all of said sensing circuits, for effectively summing up the combined pulse output of said sensing circuits to develop a normally constant control signal, said control signal changing substantially in the absence of pulse signals from any one or more of said sensing circuits;

biasing means for said pulse amplifier, comprising a zener diode clipper circuit, for applying a substantially constant operating voltage to said amplifier over said range of transmission voltages;

and a control device coupled to said pulse counter means for actuation in response to said control signal.

References Cited by the Examiner

UNITED STATES PATENTS

| | | | |
|---|---|---|---|
| 2,122,107 | 6/1938 | Meller et al. | 317—46 X |
| 3,160,786 | 12/1964 | Iaglie | 317—46 X |

STEPHEN W. CAPELLI, *Primary Examiner.*

SAMUEL BERSTEIN, *Examiner.*

R. V. LUPO, *Assistant Examiner.*